United States Patent [19]

Springer

[11] Patent Number: 4,858,561
[45] Date of Patent: Aug. 22, 1989

[54] PET LITTER ENCLOSURE

[76] Inventor: H. Thomas Springer, 169 Portsmouth St., Suite 111, Concord, N.H. 03301

[21] Appl. No.: 240,328

[22] Filed: Sep. 6, 1988

[51] Int. Cl.$^4$ ............................................. A01K 29/00
[52] U.S. Cl. ......................................... 119/1; 119/19; 160/368.1
[58] Field of Search .................... 119/1, 19, 29, 83, 85, 119/158, 159, 160; 160/354, 368.1; 135/109, 117

[56] References Cited

U.S. PATENT DOCUMENTS

| | | | |
|---|---|---|---|
| 3,136,356 | 6/1964 | Mears | 160/354 X |
| 3,156,213 | 11/1964 | Patten | 119/19 |
| 3,797,554 | 3/1974 | Johnson | 160/354 |
| 4,029,048 | 6/1977 | Gershbein | 119/1 |
| 4,184,454 | 1/1980 | Nagao | 119/160 |
| 4,348,982 | 9/1982 | Selby | 119/1 |
| 4,711,198 | 12/1987 | Mossbarger | 119/1 |
| 4,729,343 | 3/1988 | Evans | 119/19 |
| 4,766,300 | 10/1988 | Braddock | 119/1 |

OTHER PUBLICATIONS

"Rubber Dog-and-Cat Door", in Popular Mechanics, Mar. 1956, p. 121.
"Winter Quarters for Towser", in Popular Mechanics, Dec. 1962, p. 147.

Primary Examiner—Richard J. Apley
Assistant Examiner—Robert D. Bahr
Attorney, Agent, or Firm—Sughrue, Mion, Zinn, Macpeak & Seas

[57] ABSTRACT

A portable and collapsible pet litter enclosure is provided with a collapsible internal framework supporting a flexible cover. A panel at one end of the enclosure is detachably secured to the adjacent panels by slide fasteners and hook and loop fasteners to permit the insertion and removal of the frame and the container holding pet litter. A side panel of the enclosure is provided with an aperture and a cover flap substantially larger than the aperture is secured along three sides to the side panel with the fourth side having an elastic to hold the edge of the flap against the side panel. The ends of the elastic may be detachably secured to provide a non-elasticized opening during training of the pet.

5 Claims, 2 Drawing Sheets

PET LITTER ENCLOSURE

BACKGROUND OF THE INVENTION

The present invention is directed to an enclosure adapted to contain a pet litter tray and more specifically to a pet litter enclosure having an elasticized pet entrance to maintain the enclosure substantially closed to contain the litter and odors within the enclosure. Pet litter is ordinarily poured into a box or tray having relatively low sides to facilitate the use of the litter by a household pet, such as a dog or cat. Moreover, the use of an open container of litter fails to adequately contain the litter and the odors and presents a rather unattractive addition to any room in which it is located.

Various attempts have been made over the years to provide a container or enclosure into which the tray of litter would be placed to provide a more attractive appearance and to contain the litter as well as the odors emanating therefrom.

An example of such a litter box is disclosed in the U.S. Pat. No. 4,711,198 to Mossbarger. This patent discloses a throw-away cat litter box comprised of a cardboard box having a fitted cover which is upwardly pivotable at one end thereof. A plastic liner in the form of a bag containing litter is secured in the bottom of the box and the inside of the cover so that upon pivoting the cover to a raised position, the sides of the bag will unfold to define a compartment having a substantially triangular cross section configuration. A tear strip or perforations may be provided in the plastic liner adhered to the cover to provide an opening for the pet through the upraised cover portion. Flaps may be provided on the cover portion to loosely cover the opening to prevent litter from being kicked out of the box and to contain odors.

The U.S. Pat. No. 3,156,213 to Pattern discloses a mobile container for carrying and accommodating domestic animals which is comprised of a collapsible tubular framework having spaced apart triangular end portions with a rigid bottom plate extending therebetween. A flexible covering of canvas or the like is fitted over the framework and is provided with a zippered flap opening in one side which can be raised to provide a canopy for the entrance. A pair of permanently open apertures are located in opposite ends to provide for the insertion of food dishes and the like and to provide a viewing porthole for the pet. A suitable carrying handle may be provided on the top of the container.

SUMMARY OF THE INVENTION

The present invention provides a new and improved pet litter enclosure which is reusable, collapsible and easily transportable while providing a substantially sealed enclosure for the litter to prevent scattering of the litter and the emission of odors.

The present invention provides a new and improved pet litter enclosure having the configuration of a parallelepiped which is comprised of a detachable tubular frame and a flexible covering which is fitted over the frame and includes a closeable and sealable flap to provide human service access and an elasticized covered opening to provide for pet access.

The foregoing and other object features and advantages of the invention will be apparent from the following more particular description of the preferred embodiment of the invention as illustrated in the accompanying drawings.

DETAILED DESCRIPTION OF THE INVENTION

Figure 1:
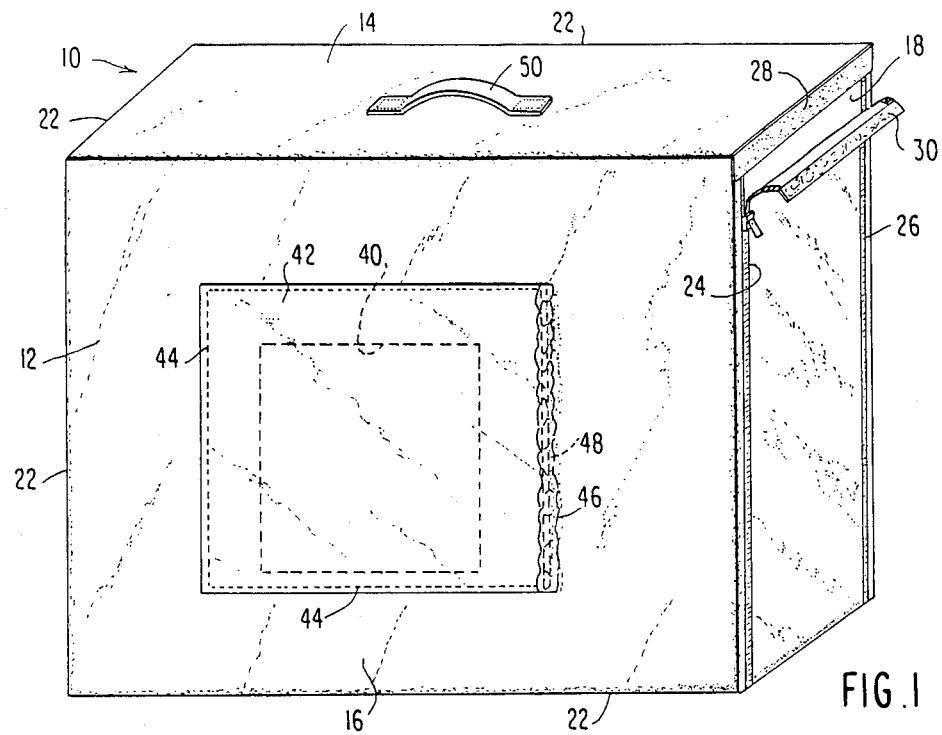
FIG. 1 is a perspective view of the pet litter enclosure in assembled and substantially closed condition.

The pet litter enclosure 10 as shown in FIG. 1 is in the form of a parallelepiped which will provide adequate room for a pet to move about within the enclosure without feeling confined as would be the case with an enclosure having a tent-like configuration or a lean-to configuration, both of which would have a substantially triangular cross sectional configuration. The enclosure is comprised of an outer covering 12 of any suitable material such as canvas, nylon or the like. The material should be relatively light-weight and flexible to facilitate handling the enclosure while providing a cover which is not only washable and durable but is also attractive in appearance. The enclosure includes a top panel 14, a front panel 16, a rear panel 18 and a first end panel 20 as shown in FIG. 1. The enclosure is also provided with a second end panel and a bottom panel which are not visible in FIG. 1. With the exception of the first end panel 20, the various panels can be individually cut and secured to each other by means of sewn seams 22 which may or may not be provided with a welt. Alternatively, several of the panels could be of integral one-piece construction, thereby reducing the number of seams necessary to from the cover.

The first end panel 20 is secured to the front and rear panels 16 and 18 by means of a pair of zippers or slide fastener closures 24 and 26, respectively. The slide fastener closures 24 and 26 extend from the bottom of the enclosure to a point spaced from the top of the enclosure and a strip of fabric 28 is sewn to the front, rear and top panels at the top ends of the slide fasteners. The strip of fabric 28 may be provided with a plurality of loops or hooks and a strip of material 30 having complementary hooks or loops is sewn to the top end of the first side panel 20 for detachable engagement with the strip of material 28. As viewed in FIG. 1, the strip 30 has been detached from the strip 28 and the slide fasteners 24 and 26 have been partially opened. Upon opening the slide fasteners 24 and 26 all the way to the bottom of the enclosure, the interior of the enclosure will be readily accessible through the opening to facilitate the insertion and removal of a tray containing pet litter. When the side fasteners 24 and 26 are closed all the way to the top thereof and the strip 30 is connected to the strip 28, the first end portion 20 will be substantially sealed about its entire periphery to the adjacent panels of the enclosure to prevent the emanation of dust and odors from the interior of the enclosure.

Figure 2:
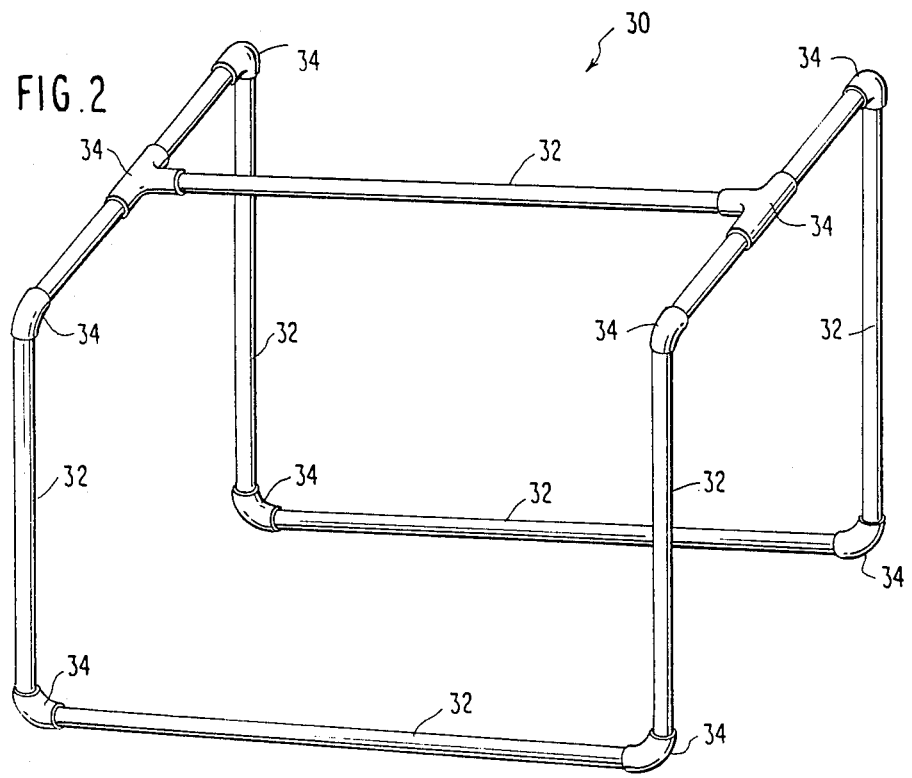
FIG. 2 is a perspective view of the framework for the pet litter enclosure without the outer covering.

The cover 12 as shown in FIG. 1 is supported by a detachable tubular frame 30 as shown in FIG. 2. The frame is comprised of a plurality of plastic pipes 32 having a ½ inch to ¾ inch outside diameter which are connected together by a plurality of molded plastic couplings 34. Some of the pipes may be permanently connected to the couplings 34 by means of a suitable adhesive, while other pipes 32 may be detachably connected to the couplings by means of a slideable friction fit connection. Thus, the frame 30 can be either completely or partially disassembled for shipment or storage. The configuration of the frame as shown in FIG. 2 has proven to be satisfactory for supporting the cover without undue sagging. However, it is understood that the configuration of the framework may be varied. For example, pipes could be provided between the couplings along all four sides of each panel of the cover.

In assembling the pet litter enclosure on the frame, the first end panel 20 is completely opened by means of the slide fasteners 24 and 26. A frame 30 can then be inserted through the open end of the cover in either the completely assembled condition as viewed in FIG. 2 or various combinations of pipes and couplings can be inserted through the end opening of the cover and the assembly completed within the cover. While the use of plastic pipes and couplings have been disclosed, it is obvious that collapsible or detachable framework having a different construction and different materials may be used.

In order to provide for the ready ingress and egress of a pet into and out of the enclosure, a closeable opening has been provided in the front panel 12 of the enclosure.

A rectangular opening 40 is cut in the front panel 12 substantially in the center of the panel. A cover panel 42 overlies the opening 40 and is secured to the panel 12 by means of stitching 44 extending along three sides of the panel. The panel 42 is not stretched taunt across the opening 40 but is provided with a certain amount of slack and the end of the panel 42 which is not stitched to the front panel 12, is provided with a tubular hem 46. An elastic tape 48 extends through the hem 46 and is secured under tension at opposite ends thereof by means of the stitching 44. Thus, the elastic will tend to gather the excess material of the panel 42 and pull it against the face of the front panel 12 to substantially seal the opening 40 to prevent the emission of dust and odors from the interior of the enclosure. Sufficient slack is provided in the hem portion to enable the pet to initially force its way between the hem 46 and the panel 12. The strength of the elastic 48 is such that the elastic will readily stretch upon passage of the pet between the hem 46 and the front panel 12.

A suitable carrying handle 50 may be secured to the top panel 14 by means of stitching or the like to facilitate moving the assembled enclosure from one place to another.

Figure 3:
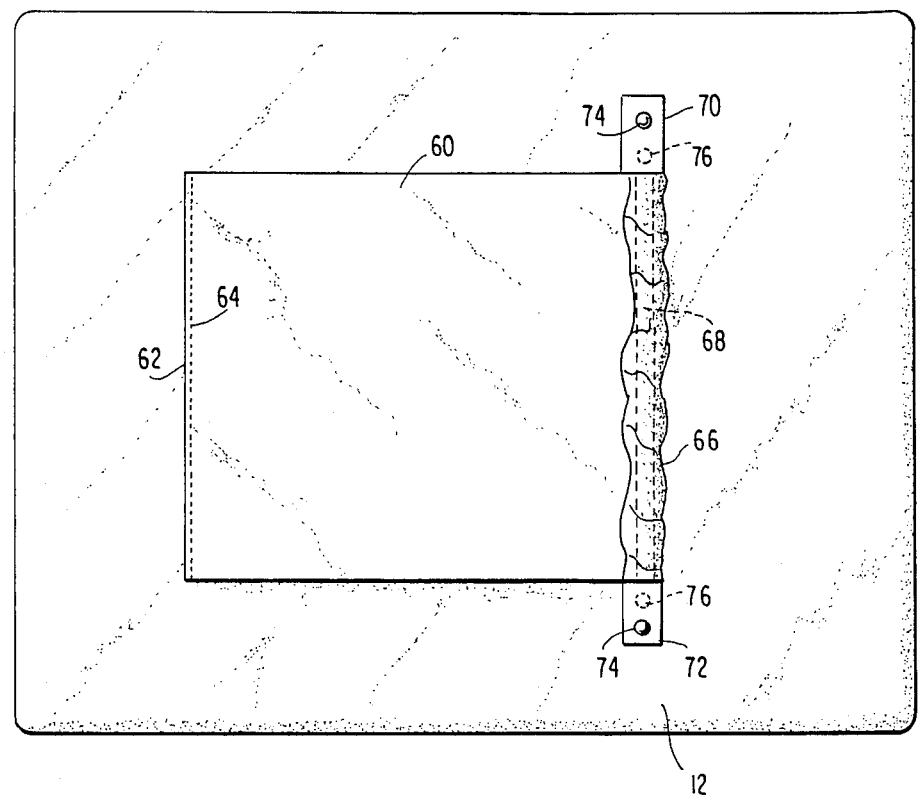
FIG. 3 is a side elevation view of a modified form of pet entrance to the enclosure.
Figure 4:
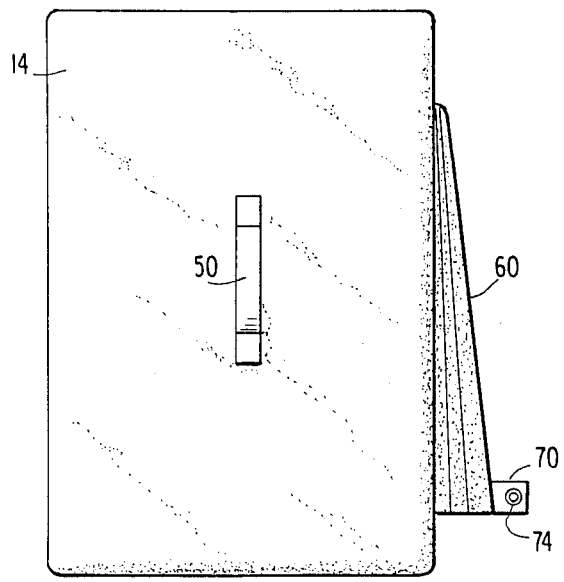
FIG. 4 is a top plan view of the modified construction shown in FIG. 3.

A modified construction of the pet entry enclosure is shown in FIGS. 3 and 4. All the other features of the pet litter enclosure are identical to the previously described embodiment of FIGS. 1 and 2. In FIG. 3, the panel 60 for covering the opening 40 in the front panel 12 is provided with considerably more excess material along the sides thereof parallel to the top and bottom panels of the enclosure. The excess material is gathered at the end 62 and stitched to the front panel 12 by means of a seam 64. The top and bottom of the panel 60 are also secured to the front panel 12 by means of stitching material is not visible in FIG. 3 due to the excess material. The right-hand edge of the front panel 60 is viewed in FIG. 3 is provided with a hem 66 similar to the hem 46 and an elastic tape extends there through and is secured under very light tension by means of the stitching securing the top and bottom edges of the panel 60 as in the previous embodiment.

It has been found that some pets are somewhat reluctant to force their way between the flap and the front panel of the enclosure during initial usage and it is often necessary to stretch the opening in the embodiment of FIG. 1 to entice the pet to enter the enclosure the first few times. Though the problem could be solved by providing a substantial excess of material along the elasticized edge of the cover panel, a relatively good closure between the cover panel and front panel of the enclosure would not be achieved. Accordingly, in the embodiment of FIGS. 3 and 4 a substantial excess of material is provided along the hem 66 of the panel 60 and a pair of straps 70 and 72 are secured to the cover 60 at a location spaced from the stitching which secures the top and bottom sides of the panel 60 to the front panel 12. One or more snap fasteners 74 may be secured to each of the straps 70 and 72 and a plurality of complementary snap fasteners 76 may be provided in alignment with the straps 70 and 72. Thus, the snap fastener 74 on each strap 70 and 72 can be secured to complementary snap fastener 76 at varying distances from the top and bottom edges of the panel 60 to vary the tension of the elastic member 68 to thereby vary the degree of opening which will be maintained between the cover panel 60 and the front panel 12 along the hemmed edge of the cover panel 60.

In practice, the snaps 74 on the straps 70 and 72 would be completely detached from the complementary snap fasteners 76 as viewed in FIG. 4 so that a gaping opening would be provided to entice the pet to enter between the hem 66 and the front panel 12 to get to the opening 40 in the front panel. As the pet becomes more accustomed to entering and leaving the enclosure, the snap fasteners 74 could be initially secured to complementary snap fasteners 76 to partially close the opening on the hemmed edge of the cover panel. As the pet becomes completely acclimated to using the enclosure, the snap fasteners 74 could be engaged with the complementary fasteners 76 furthest from the top and bottom edges of the panel 60 so that the elastic 68 will draw the hemmed edge of the cover panel into relatively close sealing engagement of the front panel 12 to prevent the emission of odors and dust.

In lieu of the snap fasteners 74 and 76, other types of fasteners could be used such as the hook and loop type fasteners used to secure the strips 28 and 30 in the embodiment of FIG. 1. While the container is designed primarily for use by cats, the size thereof could be varied to accommodate larger animals which might be trained to utilize the litter.

While the invention has been particularly shown and described with reference to preferred embodiments thereof, it will be understood by those in the art that the foregoing and other changes in form and details may be made therein without departing from the spirit and scope of the invention.

What is claimed is:

1. An enclosure for accommodating a supply of pet litter comprising:
   frame means, flexible cover means supported by said frame means to define a substantially sealed enclosure;
   said cover means including a plurality of interconnected panels;
   fastener means for at least partially detachably securing one of said panels to adjacent panels to define an opening for the insertion and removal of said frame means and a litter container;

another of said panels having a aperture therein for the passage of an animal;

a cover flap overlying said aperture and partially secured along the periphery thereof to said another of said panels with a portion of the periphery remaining unsecured; and elastic means secured to said cover flap along the unsecured portion of the periphery to draw the unsecured portion of the periphery of said flap toward said another of said panels to provide a substantially sealed enclosure for the aperture.

2. An enclosure as set forth in claim 1, wherein said frame member is comprised of a plurality of hollow tubes and a plurality of coupling members connecting said tubes at right angles to each other wherein some of said tubes are permanently secured to said coupling members with the remaining tubes being detachably connected to said coupling members to permit at least partial disassembly of said frame means.

3. An enclosure as set forth in claim 1, wherein said one of said panels is permanently secured along one edge to an adjacent panel and said fastener means is comprised on a pair of parallel slide fasteners disposed along opposite sides of said one of said panels and detachable hook and loop closure means disposed along an edge of the panel opposite the permanently secured edge to provide a sealed connection between said one of said panels and the adjacent panels.

4. An enclosure as set forth in claim 1, wherein said cover flap is substantially larger than said aperture and is connected to said another of said panels to provide substantial clearance between the unsecured edge and said another of said panels upon stretching of said elastic means to enable an animal to pass between the unsecured portion of the cover flap and said another of said panels.

5. An enclosure as set forth in claim 4, wherein the elastic means is detachably secured to said another of said panels adjacent opposite ends of said elasticized means to provide a non-elasticized opening between the unsecured edge of the flap and the adjacent panel.

* * * * *